(12) United States Patent
Prim

(10) Patent No.: US 9,574,823 B2
(45) Date of Patent: Feb. 21, 2017

(54) CARBON DIOXIDE RECYCLE PROCESS

(71) Applicant: Pilot Energy Solutions, LLC, Houston, TX (US)

(72) Inventor: Eric Prim, Houston, TX (US)

(73) Assignee: Pilot Energy Solutions, LLC, Houston, TX (US)

( * ) Notice: Subject to any disclaimer, the term of this patent is extended or adjusted under 35 U.S.C. 154(b) by 0 days.

(21) Appl. No.: 13/946,753

(22) Filed: Jul. 19, 2013

(65) Prior Publication Data

US 2013/0333417 A1 Dec. 19, 2013

Related U.S. Application Data

(63) Continuation-in-part of application No. 12/122,336, filed on May 16, 2008, now Pat. No. 8,505,332.
(Continued)

(51) Int. Cl.
*F25J 3/00* (2006.01)
*F25J 3/02* (2006.01)
(Continued)

(52) U.S. Cl.
CPC ............ *F25J 3/0209* (2013.01); *C10L 3/103* (2013.01); *C10L 3/104* (2013.01); *F25J 1/0022* (2013.01);
(Continued)

(58) Field of Classification Search
CPC ........ F25J 3/0209; F25J 3/0233; F25J 3/0242; F25J 3/0266; F25J 2200/74; F25J 2220/66; F25J 2260/80; F25J 2205/04; F25J 2215/04; F25J 2215/80; F25J 2220/02; F25J 2220/04; F25J 2220/65; F25J 2220/68; C10L 3/103; C10L 3/104
(Continued)

(56) References Cited

U.S. PATENT DOCUMENTS 2,875,833 A * 3/1959 Martin ................. E21B 43/164
166/266
2,955,081 A 10/1960 Cobb, Jr.
(Continued)

OTHER PUBLICATIONS

Foreign Communication From a Counterpart Application, Canadian Application No. 2739366, Canadian Office Action dated Aug. 21, 2013, 3 pages.
(Continued)

*Primary Examiner* — Keith Raymond
(74) *Attorney, Agent, or Firm* — Conley Rose, P.C.; Grant Rodolph

(57) ABSTRACT

A method for recovering natural gas liquids without using cryogenic conditions, membranes, and carbon dioxide recovery solvents is provided. In one embodiment, a carbon dioxide recycle stream that comprises carbon dioxide and natural gas liquids is received. The carbon dioxide recycle stream is separated into a purified carbon dioxide recycle stream and a natural gas liquids stream. The purified carbon dioxide recycle stream comprises the carbon dioxide, and the natural gas liquids stream comprises the natural gas liquids. The carbon dioxide recycle stream, the purified carbon dioxide recycle stream, and the natural gas liquids are not subjected to cryogenic conditions, membranes, and carbon dioxide recovery solvents between being received and being separated into the purified carbon dioxide recycle stream and the natural gas liquids stream.

37 Claims, 4 Drawing Sheets

Related U.S. Application Data

(60) Provisional application No. 60/938,726, filed on May 18, 2007, provisional application No. 61/730,696, filed on Nov. 28, 2012, provisional application No. 61/823,047, filed on May 14, 2013.

(51) Int. Cl.
*F25J 1/00* (2006.01)
*C10L 3/10* (2006.01)

(52) U.S. Cl.
CPC ............ *F25J 3/0233* (2013.01); *F25J 3/0242* (2013.01); *F25J 3/0266* (2013.01); *F25J 2200/02* (2013.01); *F25J 2200/74* (2013.01); *F25J 2205/04* (2013.01); *F25J 2215/04* (2013.01); *F25J 2215/80* (2013.01); *F25J 2220/04* (2013.01); *F25J 2220/66* (2013.01); *F25J 2220/68* (2013.01); *F25J 2260/80* (2013.01); *F25J 2290/10* (2013.01); *Y02C 10/12* (2013.01)

(58) Field of Classification Search
USPC ............... 62/617, 618, 620, 622, 928, 929, 62/630–631; 585/818, 802, 833, 837
See application file for complete search history.

(56) References Cited

U.S. PATENT DOCUMENTS

| | | | |
|---|---|---|---|
| 3,090,683 A | 5/1963 | Berger | |
| 3,441,483 A | 4/1969 | Hart | |
| 4,136,738 A | 1/1979 | Haynes, Jr. et al. | |
| 4,336,046 A | 6/1982 | Schorre et al. | |
| 4,374,657 A | 2/1983 | Schendel et al. | |
| 4,428,759 A * | 1/1984 | Ryan ................ | B01D 3/146 62/635 |
| 4,441,900 A | 4/1984 | Swallow | |
| 4,451,275 A | 5/1984 | Vines et al. | |
| 4,529,411 A * | 7/1985 | Goddin et al. ................... | 95/51 |
| 4,563,202 A * | 1/1986 | Yao et al. ............................ | 2/17 |
| 4,595,404 A | 6/1986 | Ozero et al. | |
| 4,664,190 A | 5/1987 | Carpentier | |
| 4,683,948 A | 8/1987 | Fleming | |
| 4,720,294 A * | 1/1988 | Lucadamo ................ | C07C 7/04 62/627 |
| 4,753,666 A | 6/1988 | Pastor et al. | |
| 4,762,543 A | 8/1988 | Pantermuehl et al. | |
| 4,765,407 A | 8/1988 | Yuvancic | |
| 5,019,279 A * | 5/1991 | Haines et al. ................ | 507/202 |
| 5,402,645 A * | 4/1995 | Johnson et al. ................ | 62/619 |
| 5,411,721 A | 5/1995 | Doshi et al. | |
| 5,687,584 A * | 11/1997 | Mehra ............................. | 62/632 |
| 6,128,919 A * | 10/2000 | Daus et al. ...................... | 62/624 |
| 6,505,683 B2 | 1/2003 | Minkkinen et al. | |
| 6,648,944 B1 * | 11/2003 | Baker et al. ...................... | 95/39 |
| 6,915,662 B2 * | 7/2005 | Wilkinson et al. ............. | 62/621 |
| 7,219,513 B1 | 5/2007 | Mostafa | |
| 7,377,127 B2 | 5/2008 | Mak | |
| 7,806,965 B2 | 10/2010 | Stinson | |
| 2003/0161780 A1* | 8/2003 | Howard et al. ............ | 423/437.1 |
| 2004/0206112 A1 | 10/2004 | Mak | |
| 2006/0065015 A1 | 3/2006 | McCoy | |
| 2008/0156035 A1 | 7/2008 | Aspelund et al. | |
| 2011/0197629 A1 | 8/2011 | Prim et al. | |
| 2013/0298601 A1 | 11/2013 | Prim | |
| 2013/0298602 A1 | 11/2013 | Prim | |
| 2013/0305777 A1 | 11/2013 | Prim | |

OTHER PUBLICATIONS

Prim, Eric.; U.S. Appl. No. 12/122,336; Title: "Natural Gas Liquid Recovery Process;" filed May 16, 2008; Specification 32 pages; 4 Drawing Sheets (Figs. 1-4).

Office Action dated Oct. 27, 2011; U.S. Appl. No. 12/122,336, filed May 16, 2008, 17 pages.
Office Action dated Jun. 29, 2012; U.S. Appl. No. 12/122,336, filed May 16, 2008, 18 pages.
Office Action dated Feb. 21, 2013; U.S. Appl. No. 12/122,336, filed May 16, 2008, 24 pages.
Notice of Allowance dated May 8, 2013; U.S. Appl. No. 12/122,336, filed May 16, 2008; 23 pages.
Office Action dated Jul. 19, 2012; U.S. Appl. No. 13/096,788, filed Apr. 28, 2011; 22 pages.
Office Action dated May 8, 2013; U.S. Appl. No. 13/096,788, filed Apr. 28, 2011; 23 pages.
Office Action dated Jun. 18, 2014; U.S. Appl. No. 13/096,788, filed Apr. 28, 2011; 26 pages.
Office Action dated Sep. 23, 2014, U.S. Appl. No. 13/096,788, filed Apr. 28, 2011, 3 pages.
Office Action dated Jul. 15, 2014; U.S. Appl. No. 13/946,773, filed Jul. 19, 2013; 28 pages.
Office Action dated Jul. 15, 2014; U.S. Appl. No. 13/946,774, filed Jul. 19, 2013; 26 pages.
Office Action dated Jul. 14, 2014; U.S. Appl. No. 13/946,789, filed Jul. 19, 2013; 25 pages.
Foreign Communication From a Counterpart Application, Canadian Application No. 2739366, Canadian Office Action dated Apr. 16, 2014, 2 pages.
Notice of Allowance dated Mar. 27, 2015; U.S. Appl. No. 13/096,788, filed Apr. 28, 2011; 9 pages.
Office Action dated Oct. 23, 2014, 36 pages, U.S. Appl. No. 13/096,788, filed Apr. 28, 2011.
Office Action dated Jan. 29, 2015 U.S. Appl. No. 13/946,773, filed Jul. 19, 2013; 24 pages.
Office Action dated Feb. 3, 2015, U.S. Appl. No. 13/946,789, filed Jul. 19, 2013, 22 pages.
Notice of Allowance dated May 19, 2015, 13 pages, U.S. Appl. No. 13/096,788, filed Apr. 28, 2011.
Office Action dated May 13, 2015, 9 pages, U.S. Appl. No. 13/946,773, filed Jul. 19, 2013.
Notice of Allowance dated May 14, 2015, 12 pages, U.S. Appl. No. 13/946,789, filed Jul. 19, 2013.
Notice of Allowance dated Jun. 19, 2015, 8 pages, U.S. Appl. No. 13/946,789, filed Jul. 19, 2013.
Notice of Allowance dated Jul. 23, 2015, 10 pages, U.S. Appl. No. 13/096,788, filed Apr. 28, 2015.
Office Action dated Aug. 5, 2015, 23 pages, U.S. Appl. No. 13/946,773, filed Jul. 19, 2013.
Office Action dated Feb. 10, 2015, 23 pages, U.S. Appl. No. 13/946,774, filed Jul. 19, 2013.
Office Action dated Jun. 12, 2015, 12 pages, U.S. Appl. No. 13/946,774, filed Jul. 19, 2013.
Notice of Allowance dated Oct. 6, 2015, 14 pages, U.S. Appl. No. 13/946,774, filed Jul. 19, 2013.
Notice of Allowance dated Dec. 8, 2015, 15 pages, U.S. Appl. No. 13/946,774, filed Jul. 19, 2013.
Foreign Communication From a Counterpart Application, Canadian Application No. 2739366, Canadian Office Action dated Oct. 21, 2015, 4 pages.
Foreign Communication From a Counterpart Application, Canadian Application No. 2739366, Canadian Office Action dated Jan. 21, 2015, 2 pages.
Foreign Communication From a Counterpart Application, Canadian Application No. 2739366, Canadian Notice of Allowance dated May 20, 2016, 1 pages.
Office Action dated May 6, 2016, 17 pages, U.S. Appl. No. 13/946,773, filed Jul. 19, 2013.
Office Action dated Nov. 1, 2016, 7 pages, U.S. Appl. No. 13/096,788, filed Apr. 28, 2011.
Office Action dated Dec. 5, 2016, 24 pages, U.S. Appl. No. 13/946,773, filed Jul. 19, 2013.

* cited by examiner

CARBON DIOXIDE RECYCLE PROCESS

CROSS-REFERENCE TO RELATED APPLICATIONS

The present application is a continuation-in-part of U.S. patent application Ser. No. 12/122,336 filed May 16, 2008, which claims priority to U.S. Provisional Patent Application No. 60/938,726 filed May 18, 2007, both of which are incorporated herein by reference as if reproduced in their entirety. The present application also claims priority to U.S. Provisional Patent Application No. 61/730,696 filed Nov. 28, 2012 and U.S. Provisional Application No. 61/823,047 filed May 14, 2013, both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Carbon dioxide ($CO_2$) is a naturally occurring substance in most hydrocarbon subterranean formations. Carbon dioxide may also be used for recovering or extracting oil and hydrocarbons from subterranean formations. One carbon dioxide based recovery process involves injecting carbon dioxide into an injection well, and recovering heavy hydrocarbons and perhaps some of the carbon dioxide from at least one recovery well. Carbon dioxide reinjection process may also produce natural gas liquids (NGLs).

SUMMARY

In one aspect, the disclosure includes a method for recovering natural gas liquids. A carbon dioxide recycle stream that comprises carbon dioxide and natural gas liquids is received. The carbon dioxide recycle stream is separated into a purified carbon dioxide recycle stream and a natural gas liquids stream. The purified carbon dioxide recycle stream comprises the carbon dioxide, and the natural gas liquids stream comprises the natural gas liquids. The carbon dioxide recycle stream, the purified carbon dioxide recycle stream, and the natural gas liquids are not subjected to cryogenic conditions, membranes, and carbon dioxide recovery solvents between being received and being separated into the purified carbon dioxide recycle stream and the natural gas liquids stream.

In another aspect, the disclosure includes a system comprising piping and a separator. The piping is configured to receive a recycle stream, wherein the recycle stream comprises an injection gas and $C_3$ to $C_8$ hydrocarbons. The separator is coupled to the piping and is configured to separate the recycle stream into a purified recycle stream and a natural gas liquids stream, wherein the purified recycle stream comprises the injection gas, and wherein the natural gas liquids stream comprises the $C_3$ to $C_8$ hydrocarbons. The system is configured such that the recycle stream, the purified recycle stream, and the natural gas liquids stream are not subjected to cryogenic conditions, membranes, and carbon dioxide recovery solvents between being received and being separated into the purified recycle stream and the natural gas liquids stream.

In yet another aspect, the disclosure includes a set of process equipment comprising an input line, a separator, a first output line, and a second output line. The input line is configured to receive a recycle stream, wherein the recycle stream comprises an injection gas and natural gas liquids. The separator is configured to receive the recycle stream from the input line and separate the recycle stream into a purified recycle stream and a natural gas liquids stream. The first output line is configured to output the purified recycle stream from the separator, wherein the purified recycle stream comprises the injection gas. The second output line is configured to output the natural gas liquids stream from the separator, wherein the natural gas liquids stream comprises the natural gas liquids. The set of process equipment is configured such that the recycle stream, the purified recycle stream, and the natural gas liquids stream are not subjected to cryogenic conditions, membranes, and carbon dioxide recovery solvents between being received and being separated into the purified recycle stream and the natural gas liquids stream.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a NGL recovery process that may be implemented as part of a carbon dioxide reinjection process to recover NGLs from a carbon dioxide recycle stream. When implementing a carbon dioxide reinjection process, the carbon dioxide is typically injected downhole into an injection well and a stream comprising hydrocarbons and carbon dioxide is generally recovered from a recovery well. The carbon dioxide may be separated from the heavy hydrocarbons and then recycled downhole, e.g. in the reinjection well. In some cases, the carbon dioxide recycle stream may comprise some NGLs, which may be recovered prior to injecting the carbon dioxide recycle stream downhole. The NGL recovery process may be optimized by weighing the NGL recovery rate against the amount of energy expended on NGL recovery.

Figure 1:
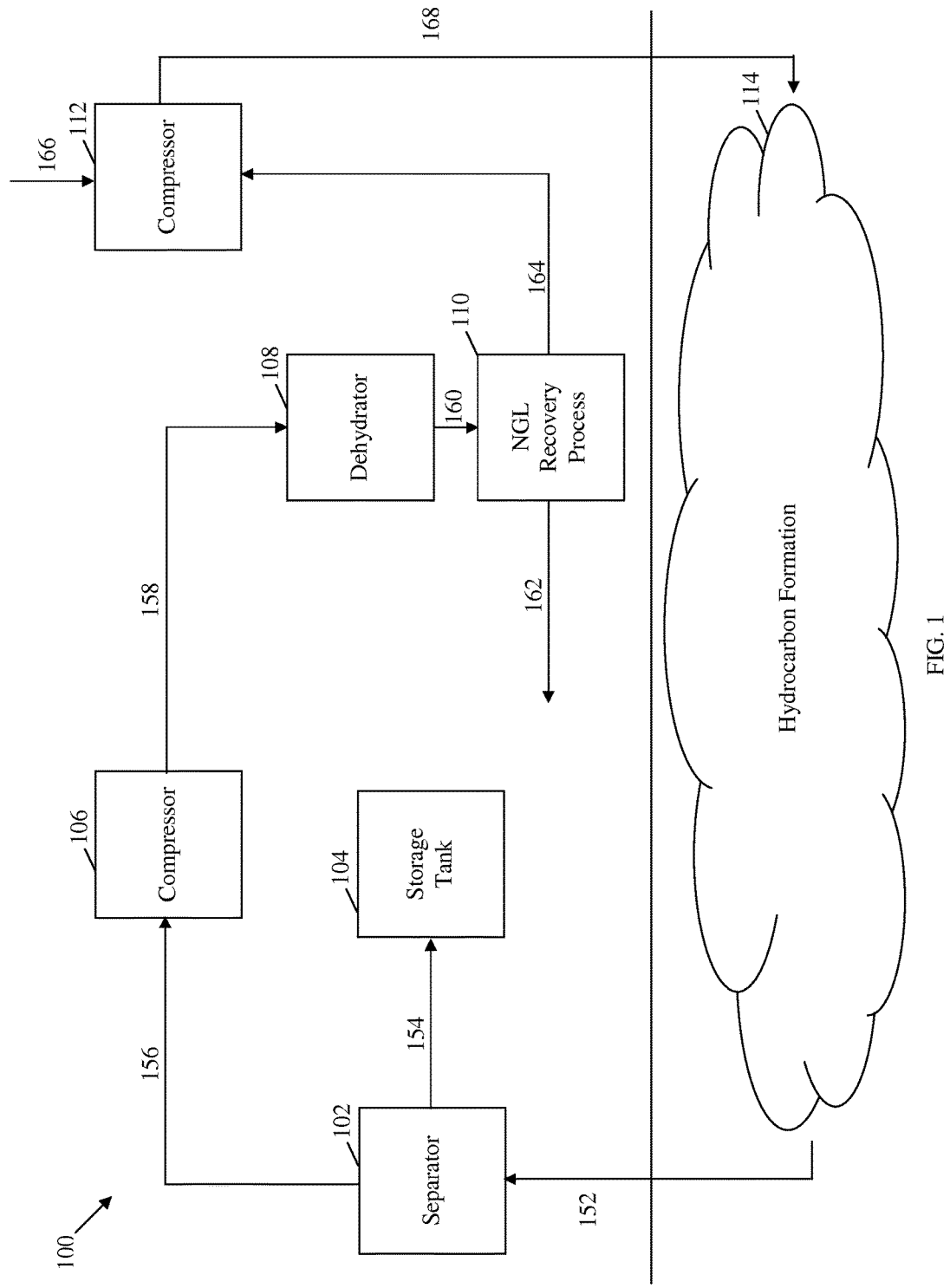
FIG. 1 is a process flow diagram for an embodiment of a carbon dioxide reinjection process.

FIG. 1 illustrates an embodiment of a carbon dioxide reinjection process 100. The carbon dioxide reinjection process 100 may receive hydrocarbons and carbon dioxide from a subterranean formation 114, separate heavy hydrocarbons and some of the NGLs from the carbon dioxide, and inject the carbon dioxide downhole. As shown in FIG. 1, additional process steps may be included in the carbon dioxide reinjection process, such as compressing the carbon dioxide, dehydrating the carbon dioxide, and/or adding additional carbon dioxide to the carbon dioxide recycle stream. The specific steps in the carbon dioxide reinjection process 100 are explained in further detail below.

The carbon dioxide reinjection process 100 may receive a hydrocarbon feed stream 152 from a subterranean formation 114. The hydrocarbon feed stream 152 may be obtained from at least one recovery well as indicated by the upward arrow in FIG. 1, but may also be obtained from other types of wells. In addition, the hydrocarbon feed stream 152 may be obtained from the subterranean formation 114 using any suitable method. For example, if a suitable pressure differential exists between the subterranean formation 114 and the surface, the hydrocarbon feed stream 152 may flow to the surface via the pressure differential. Alternatively, surface and/or downhole pumps may be used to draw the hydrocarbon feed stream 152 from the subterranean formation 114 to the surface.

Although the composition of the hydrocarbon feed stream 152 will vary from one location to another, the hydrocarbon feed stream 152 may comprise carbon dioxide, methane, ethane, NGLs, heavy hydrocarbons, hydrogen sulfide ($H_2S$), helium, nitrogen, water, or combinations thereof. The term "hydrocarbon" may refer to any compound comprising, consisting essentially of, or consisting of carbon and hydrogen atoms. The term "natural gas" may refer to any hydrocarbon that may exist in a gas phase under atmospheric or downhole conditions, and includes methane and ethane, but may also include diminishing amounts of $C_3$-$C_8$ hydrocarbons. The term "natural gas liquids" or NGLs may refer to natural gases that may be liquefied without refrigeration, and may include $C_3$-$C_8$ hydrocarbons. Both natural gas and NGL are terms known in the art and are used herein as such. In contrast, the term "heavy hydrocarbons" may refer to any hydrocarbon that may exist in a liquid phase under atmospheric or downhole conditions, and generally includes liquid crude oil, which may comprise $C_{9+}$ hydrocarbons, branched hydrocarbons, aromatic hydrocarbons, and combinations thereof.

The hydrocarbon feed stream 152 may enter a separator 102. The separator 102 may be any process equipment suitable for separating at least one inlet stream into a plurality of effluent streams having different compositions, states, temperatures, and/or pressures. For example, the separator 102 may be a column having trays, packing, or some other type of complex internal structure. Examples of such columns include scrubbers, strippers, absorbers, adsorbers, packed columns, and distillation columns having valve, sieve, or other types of trays. Such columns may employ weirs, downspouts, internal baffles, temperature control elements, and/or pressure control elements. Such columns may also employ some combination of reflux condensers and/or reboilers, including intermediate stage condensers and reboilers. Alternatively, the separator 102 may be a phase separator, which is a vessel that separates an inlet stream into a substantially vapor stream and a substantially liquid stream, such as a knock-out drum, flash drum, reboiler, condenser, or other heat exchanger. Such vessels may also have some internal baffles, temperature control elements, and/or pressure control elements, but generally lack any trays or other type of complex internal structure commonly found in columns. The separator 102 may also be any other type of separator, such as a membrane separator.

In a specific embodiment, the separator 102 is a knock-out drum. Finally, the separator 102 may be any combination of the aforementioned separators 102 arranged in series, in parallel, or combinations thereof.

The separator 102 may produce a heavy hydrocarbon stream 154 and a carbon dioxide recycle stream 156. The heavy hydrocarbon stream 154 may comprise most of the heavy hydrocarbons from the hydrocarbon feed stream 152. In embodiments, the heavy hydrocarbon stream 154 may comprise at least about 90 percent, at least about 95 percent, at least about 99 percent, or substantially all of the heavy hydrocarbons from the hydrocarbon feed stream 152. The heavy hydrocarbon stream 154 may be sent to a pipeline for transportation or a storage tank 104, where it is stored until transported to another location or further processed. In contrast, the carbon dioxide recycle stream 156 may comprise most of the carbon dioxide from the hydrocarbon feed stream 152. In embodiments, the carbon dioxide recycle stream 156 may comprise at least about 90 percent, at least about 95 percent, at least about 99 percent, or substantially all of the carbon dioxide from the hydrocarbon feed stream 152. Similarly, the carbon dioxide recycle stream 156 may comprise at least about 80 percent, at least about 90 percent, at least about 95 percent, or substantially all of the natural gas from the hydrocarbon feed stream 152. All of the percentages referred to herein are molar percentages until otherwise specified.

The carbon dioxide recycle stream 156 may enter a compressor 106. The compressor 106 may be any process equipment suitable for increasing the pressure, temperature, and/or density of an inlet stream. The compressor 106 may be configured to compress a substantially vapor phase inlet stream, a substantially liquid phase inlet stream, or combinations thereof. As such, the term "compressor" may include both compressors and pumps, which may be driven by electrical, mechanical, hydraulic, or pneumatic means. Specific examples of suitable compressors 106 include centrifugal, axial, positive displacement, turbine, rotary, and reciprocating compressors and pumps. In a specific embodiment, the compressor 106 is a turbine compressor. Finally, the compressor 106 may be any combination of the aforementioned compressors 106 arranged in series, in parallel, or combinations thereof.

The compressor 106 may produce a compressed carbon dioxide recycle stream 158. The compressed carbon dioxide recycle stream 158 may contain the same composition as the carbon dioxide recycle stream 156, but at a higher energy level. The additional energy in the compressed carbon dioxide recycle stream 158 may be obtained from energy added to the compressor 106, e.g. the electrical, mechanical, hydraulic, or pneumatic energy. In embodiments, difference in energy levels between the compressed carbon dioxide recycle stream 158 and the carbon dioxide recycle stream 156 is at least about 50 percent, at least about 65 percent, or at least about 80 percent of the energy added to the compressor 106.

The compressed carbon dioxide recycle stream 158 may enter a dehydrator 108. The dehydrator 108 may remove some or substantially all of the water from the compressed carbon dioxide recycle stream 158. The dehydrator 108 may be any suitable dehydrator, such as a condenser, an absorber, or an adsorber. Specific examples of suitable dehydrators 108 include refrigerators, molecular sieves, liquid desiccants such as glycol, solid desiccants such as silica gel or calcium chloride, and combinations thereof. The dehydrator 108 may also be any combination of the aforementioned dehydrators 108 arranged in series, in parallel, or combinations thereof.

In a specific embodiment, the dehydrator 108 is a glycol unit. Any water accumulated within or exiting from the dehydrator 108 may be stored, used for other processes, or discarded.

The dehydrator 108 may produce a dehydrated carbon dioxide recycle stream 160. The dehydrated carbon dioxide recycle stream 160 may contain little water, e.g. liquid water or water vapor. In embodiments, the dehydrated carbon dioxide recycle stream 160 may comprise no more than about 5 percent, no more than about 3 percent, no more than about 1 percent, or be substantially free of water.

Figure 2:
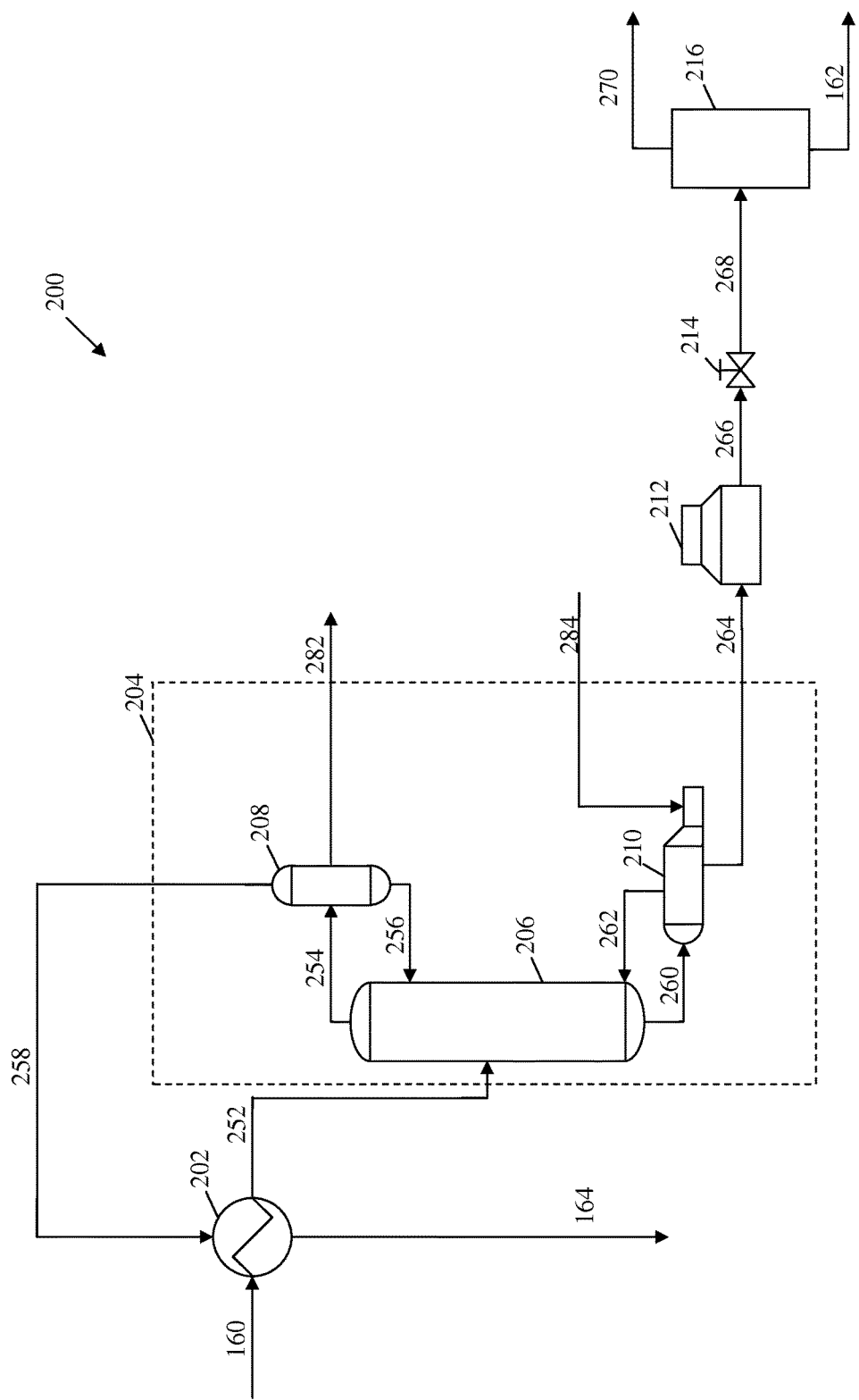
FIG. 2 is a schematic diagram of an embodiment of a NGL recovery process.

The dehydrated carbon dioxide recycle stream 160 may enter a NGL recovery process 110. The NGL recovery process 110 may separate the dehydrated carbon dioxide recycle stream 160 into a NGL rich stream 162 and a purified carbon dioxide recycle stream 164. The NGL rich stream 162 may only comprise a portion of the total NGLs from the dehydrated carbon dioxide recycle stream 160. For example, the NGL rich stream 162 may comprise less than about 70 percent, from about 10 percent to about 50 percent, or from about 20 percent to about 35 percent of the NGLs from the dehydrated carbon dioxide recycle stream 160. By taking a less aggressive cut of the NGLs and/or disregarding the recovery of methane, ethane, and optionally propane from the dehydrated carbon dioxide recycle stream 160, the NGL recovery process 110 may produce a relatively high quality NGL rich stream 162 with relatively little process equipment or energy. A specific example of a suitable NGL recovery process 110 is shown in FIG. 2 and described in further detail below.

As mentioned above, the NGL recovery process 110 may produce a relatively high-quality NGL rich stream 162. Specifically, while the NGL recovery process 110 recovers only a portion, e.g., about 20 to about 35 percent, of the NGLs in the dehydrated carbon dioxide recycle stream 160, the resulting NGL rich stream 162 is relatively lean with respect to methane, ethane, and acid gases. For example, the NGL rich stream 162 may comprise most of the butane and heavier components from the dehydrated carbon dioxide recycle stream 160. For example, the NGL rich stream 162 may comprise at least about 90 percent, at least about 95 percent, at least about 99 percent, or substantially all of the $C_{4+}$ from the dehydrated carbon dioxide recycle stream 160. In embodiments, the NGL rich stream 162 may comprise no more than about 10 percent, no more than about 5 percent, no more than about 1 percent, or be substantially free of ethane. Similarly, the NGL rich stream 162 may comprise no more than about 5 percent, no more than about 3 percent, no more than about 1 percent, or be substantially free of methane. Moreover, the NGL rich stream 162 may comprise no more than about 5 percent, no more than about 3 percent, no more than about 1 percent, or be substantially free of acid gases, such as carbon dioxide or hydrogen sulfide. It will be realized that the composition of the NGL rich stream 162 may be dependent on the dehydrated carbon dioxide recycle stream 160 composition. The examples provided below show the composition of the NGL rich stream 162 for three different dehydrated carbon dioxide recycle stream 160 compositions. The NGL rich stream 162 may be sent to a pipeline for transportation or a storage tank, where it is stored until transported to another location or further processed.

As mentioned above, the NGL recovery process 110 may produce a purified carbon dioxide recycle stream 164. The purified carbon dioxide recycle stream 164 may comprise most of the carbon dioxide from the dehydrated carbon dioxide recycle stream 160, as well as some other components such as methane, ethane, propane, butane, nitrogen, and hydrogen sulfide. In embodiments, the purified carbon dioxide recycle stream 164 may comprise at least about 90 percent, at least about 95 percent, at least about 99 percent, or substantially all of the carbon dioxide from the dehydrated carbon dioxide recycle stream 160. In addition, the purified carbon dioxide recycle stream 164 may comprise at least about 90 percent, at least about 95 percent, at least about 99 percent, or substantially all of the methane from the dehydrated carbon dioxide recycle stream 160. As such, the purified carbon dioxide recycle stream 164 may comprise at least about 65 percent, at least about 80 percent, at least about 90 percent, or at least about 95 percent carbon dioxide. In embodiments, the purified carbon dioxide recycle stream 164 may comprise no more than about 10 percent, no more than about 5 percent, no more than about 1 percent, or be substantially free of $C_{3+}$. Similarly, the purified carbon dioxide recycle stream 164 may comprise no more than about 20 percent, no more than about 10 percent, no more than about 5 percent, or be substantially free of $C_{2+}$.

The purified carbon dioxide recycle stream 164 may enter a compressor 112. The compressor 112 may comprise one or more compressors, such as the compressor 106 described above. In a specific embodiment, the compressor 112 is a turbine compressor. The compressor 112 may compress the purified carbon dioxide recycle stream 164, thereby producing a carbon dioxide injection stream 168. The carbon dioxide injection stream 168 may contain the same composition as the purified carbon dioxide recycle stream 164, but at a higher energy level. The additional energy in the carbon dioxide injection stream 168 may be obtained from energy added to the compressor 112, e.g. the electrical, mechanical, hydraulic, or pneumatic energy. In embodiments, difference in energy levels between the carbon dioxide injection stream 168 and the purified carbon dioxide recycle stream 164 is at least about 50 percent, at least about 65 percent, or at least about 80 percent of the energy added to the compressor 112.

In some embodiments, a makeup stream 166 may be combined with either the purified carbon dioxide recycle stream 164 or the carbon dioxide injection stream 168. Specifically, as the carbon dioxide reinjection process 100 is operated, carbon dioxide and other compounds will be lost, e.g. by replacing the hydrocarbons in the subterranean formation 114, by leakage into inaccessible parts of the subterranean formation 114, and/or to other causes. Alternatively, it may be desirable to increase the amount of carbon dioxide and other compounds injected downhole. As such, the makeup stream 166 may be combined with either the purified carbon dioxide recycle stream 164 and/or the carbon dioxide injection stream 168, for example in the compressor 112. Alternatively or additionally, the makeup stream 166 may be combined with the carbon dioxide recycle stream 156, the compressed carbon dioxide recycle stream 158, the dehydrated carbon dioxide recycle stream 160, or combinations thereof. The makeup stream 166 may comprise carbon dioxide, nitrogen, methane, ethane, air, water, or any other suitable compound. In an embodiment, the makeup stream 166 comprises at least 75 percent, at least 85 percent, or at least 95 percent carbon dioxide, nitrogen, methane, air, water, or combinations thereof.

FIG. 2 illustrates an embodiment of a NGL recovery process 200. The NGL recovery process 200 may recover some of the NGLs from a carbon dioxide recycle stream described above. For example, the NGL recovery process 200 may be implemented as part of the carbon dioxide reinjection process 100, e.g. by separating the dehydrated carbon dioxide recycle stream 160 into a NGL rich stream 162 and a purified carbon dioxide recycle stream 164.

The NGL recovery process 200 may begin by cooling the dehydrated carbon dioxide recycle stream 160 in a heat exchanger 202. The heat exchanger 202 may be any equipment suitable for heating or cooling one stream using another stream. Generally, the heat exchanger 202 is a relatively simple device that allows heat to be exchanged between two fluids without the fluids directly contacting each other. Examples of suitable heat exchangers 202 include shell and tube heat exchangers, double pipe heat exchangers, plate fin heat exchangers, bayonet heat exchangers, reboilers, condensers, evaporators, and air coolers. In the case of air coolers, one of the fluids is atmospheric air, which may be forced over tubes or coils using one or more fans. In a specific embodiment, the heat exchanger 202 is a shell and tube heat exchanger.

As shown in FIG. 2, the dehydrated carbon dioxide recycle stream 160 may be cooled using the cooled, purified carbon dioxide recycle stream 258. Specifically, the dehydrated carbon dioxide recycle stream 160 is cooled to produce the cooled carbon dioxide recycle stream 252, and the cooled, purified carbon dioxide recycle stream 258 is heated to produce the purified carbon dioxide recycle stream 164. The efficiency of the heat exchange process depends on several factors, including the heat exchanger design, the temperature, composition, and flowrate of the hot and cold streams, and/or the amount of thermal energy lost in the heat exchange process. In embodiments, the difference in energy levels between the dehydrated carbon dioxide recycle stream 160 and the cooled carbon dioxide recycle stream 252 is at least about 60 percent, at least about 70 percent, at least about 80 percent, or at least about 90 percent of the difference in energy levels between the cooled, purified carbon dioxide recycle stream 258 and the purified carbon dioxide recycle stream 164.

The cooled carbon dioxide recycle stream 252 then enters a NGL stabilizer 204. The NGL stabilizer 204 may comprise a separator 206, a condenser 208, and a reboiler 210. The separator 206 may be similar to any of the separators described herein, such as separator 102. In a specific embodiment, the separator 206 is a distillation column. The condenser 208 may receive an overhead 254 from the separator 206 and produce the cooled, purified carbon dioxide recycle stream 258 and a reflux stream 256, which is returned to the separator 206. The condenser 208 may be similar to any of the heat exchangers described herein, such as heat exchanger 202. In a specific embodiment, the condenser 208 is a shell and tube, kettle type condenser coupled to a refrigeration process, and contains a reflux accumulator. As such, the condenser 208 may remove some energy 282 from the reflux stream 256 and cooled, purified carbon dioxide recycle stream 258, typically by refrigeration. The cooled, purified carbon dioxide recycle stream 258 is substantially similar in composition to the purified carbon dioxide recycle stream 164 described above. Similarly, the reboiler 210 may receive a bottoms stream 260 from the separator 206 and produce a sour NGL rich stream 264 and a boil-up stream 262, which is returned to the separator 206. The reboiler 210 may be like any of the heat exchangers described herein, such as heat exchanger 202. In a specific embodiment, the reboiler 210 is a shell and tube heat exchanger coupled to a hot oil heater. As such, the reboiler 210 adds some energy 284 to the boil-up stream 262 and the sour NGL rich stream 264, typically by heating. The sour NGL rich stream 264 may be substantially similar in composition to the NGL rich stream 162, with the exception that the sour NGL rich stream 264 has some additional acid gases, e.g. acid gases 270 described below.

The sour NGL rich stream 264 may then be cooled in another heat exchanger 212. The heat exchanger 212 may be like any of the heat exchangers described herein, such as heat exchanger 202. For example, the heat exchanger 212 may be an air cooler as described above. A cooled, sour NGL rich stream 266 exits the heat exchanger 212 and enters a throttling valve 214. The throttling valve 214 may be an actual valve such as a gate valve, globe valve, angle valve, ball valve, butterfly valve, needle valve, or any other suitable valve, or may be a restriction in the piping such as an orifice or a pipe coil, bend, or size reduction. The throttling valve 214 may reduce the pressure, temperature, or both of the cooled, sour NGL rich stream 266 and produce a low-pressure sour NGL rich stream 268. The cooled, sour NGL rich stream 266 and the low-pressure sour NGL rich stream 268 have substantially the same composition as the sour NGL rich stream 264, albeit with lower energy levels.

The low-pressure sour NGL rich stream 268 may then be sweetened in a separator 216. The separator 216 may be similar to any of the separators described herein, such as separator 102. In an embodiment, the separator 216 may be one or more packed columns that use a sweetening process to remove acid gases from the low-pressure sour NGL rich stream 268. Suitable sweetening processes include amine solutions, physical solvents such as SELEXOL or RECTISOL, mixed amine solution and physical solvents, potassium carbonate solutions, direct oxidation, absorption, adsorption using, e.g., molecular sieves, or membrane filtration. The separator 216 may produce the NGL rich stream 162 described above. In addition, any acid gases 270 accumulated within or exiting from the separator 216 may be stored, used for other processes, or suitably disposed of. Finally, while FIGS. 1 and 2 are described in the context of carbon dioxide reinjection, it will be appreciated that the concepts described herein can be applied to other reinjection processes, for example those using nitrogen, air, or water.

Figure 3:
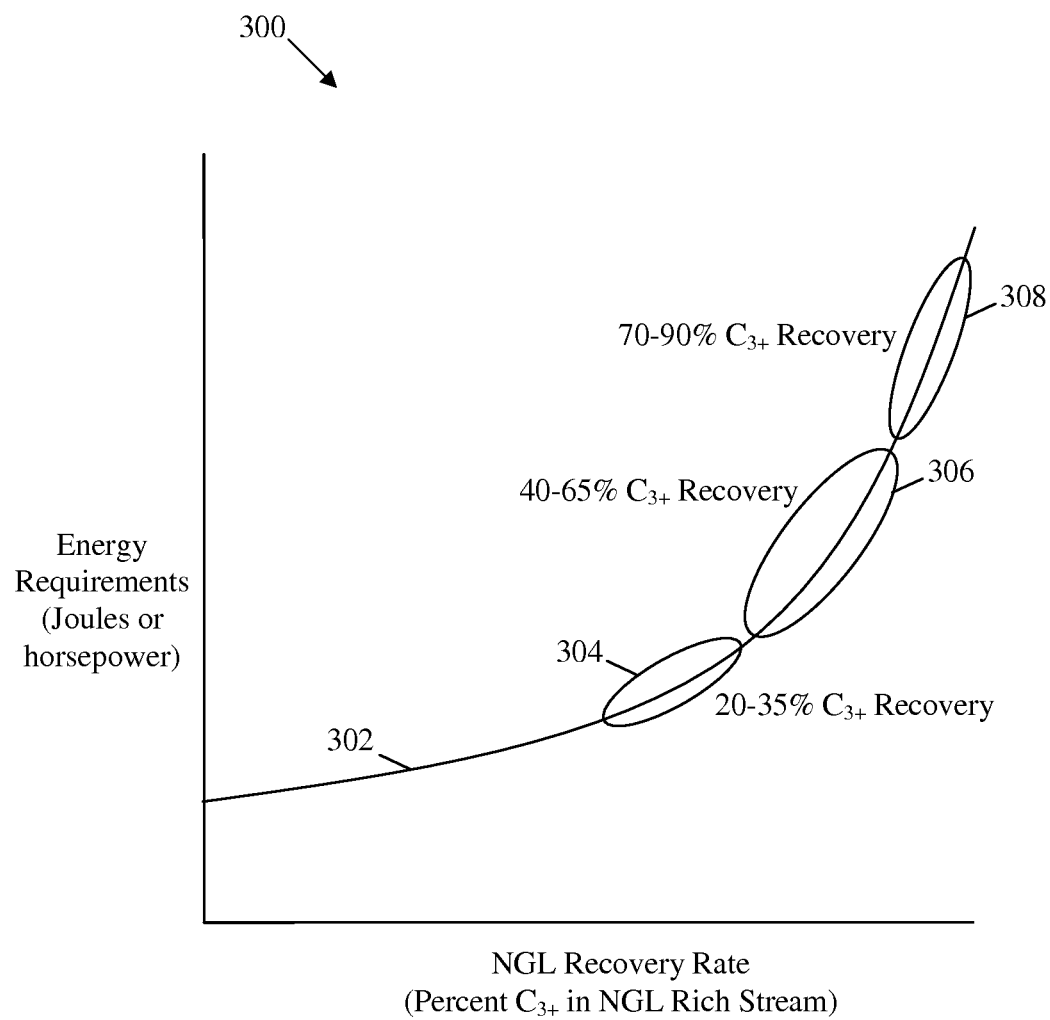
FIG. 3 is a chart depicting an embodiment of the relationship between the NGL recovery rate and the energy requirement.

FIG. 3 illustrates an embodiment of a chart 300 depicting the relationship between the NGL recovery rate and the energy expended to recover NGLs in the NGL recovery process. The NGL recovery rate may be a percentage recovery, and may represent the amount of $C_{3+}$ in the carbon dioxide recycle stream that is recovered in the NGL rich stream. The energy requirement may be measured in joules (J) or in horsepower (hp), and may represent the energy required to generate the condenser energy and reboiler energy described above. If additional compressors are needed at any point in the carbon dioxide reinjection process than would be required in an otherwise similar carbon dioxide reinjection process that lacks the NGL recovery process, then the energy required to operate such compressors may be included in the energy requirement shown in FIG. 3.

As shown by curve 302, the energy requirements may increase about exponentially as the NGLs are recovered at higher rates. In other words, substantially higher energy may be required to recover the NGLs at incrementally higher rates. For example, recovering a first amount 304 of from about 20 percent to about 35 percent of $C_{3+}$ may require substantially less energy than recovering a second amount 306 of from about 40 percent to about 65 percent of $C_{3+}$. Moreover, recovering the second amount 306 of from about 40 percent to about 65 percent of $C_{3+}$ may require substantially less energy than recovering a third amount 308 of from about 70 percent to about 90 percent of $C_{3+}$. Such significant reduction in energy requirements may be advantageous in terms of process feasibility and cost, where relatively small decreases in NGL recovery rates may require significantly less energy and process equipment, yielding significantly better process economics. Although the exact relationship of the curve 302 may depend on numerous factors especially the price of $C_{3+}$, in an embodiment the economics of the NGL recovery process when the NGL recovery rate is in the second amount 306 may be better than the economics of the NGL recovery process when the NGL recovery rate is in the third amount 308. Similarly, the economics of the NGL recovery process when the NGL recovery rate is in the first amount 304 may be significantly better than the economics of the NGL recovery process when the NGL recovery rate is in the second amount 306. Such a relationship is counterintuitive considering that in many other processes, the process economics generally improve with increased recovery rates.

Figure 4:
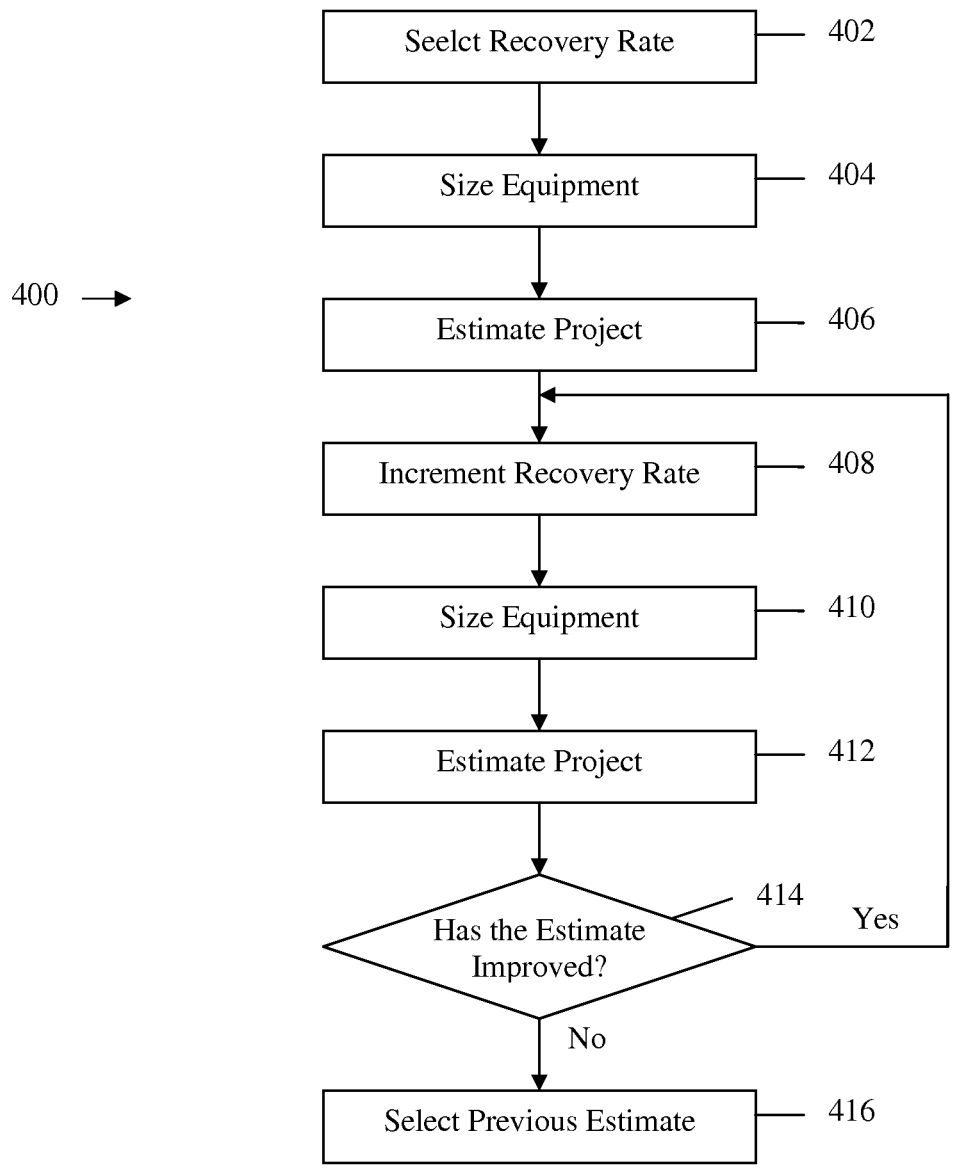
FIG. 4 is a flowchart of an embodiment of a NGL recovery optimization method.

FIG. 4 illustrates an embodiment of a NGL recovery optimization method 400. The NGL recovery optimization method 400 may be used to determine an improved or optimal project estimate for implementing the NGL recovery process and recovering NGLs at a suitable rate. As such, the NGL recovery process may be configured using appropriate equipment design based on the NGL recovery rate. Specifically, the NGL recovery optimization method 400 may design or configure the equipment size, quantity, or both based on an initial NGL recovery rate and required energy, and hence estimate the project feasibility and cost. The method 400 may upgrade or improve the project estimate by iteratively incrementing the initial NGL recovery rate, re-estimating the project, and comparing the two estimates.

At block 402, the method 400 may select an initial NGL recovery rate. The initial NGL recovery rate may be relatively small, such as no more than about 20 percent recovery, no more than about 10 percent recovery, no more than about 5 percent recovery, or no more than about 1 percent recovery. Choosing the initial NGL recovery rate at a small percentage of the total NGL amount may result in a relatively low project estimate that may be increased gradually to reach improved estimates.

The method 400 may then proceed to block 404, where the project equipment size may be determined based on the initial NGL recovery rate. Specifically, the size of the equipment described in the NGL recovery process and any additional compressors as described above may be determined. In addition, the pressure and temperature ratings and material compositions of such equipment may be determined at block 404, if desired.

The method 400 may then proceed to block 406, where the project may be estimated. Project estimation may comprise an economic evaluation of the NGL recovery process, and may include the cost of obtaining, fabricating, and/or field constructing the equipment sized in block 404. In addition, project estimation may include the cost of operating and maintaining the NGL process, as well as the revenue generated by the sale or use of the products obtained by implementing the NGL process. As such, the project estimate may comprise the total project benefits (including production, sales, etc.) minus the total project capital and operating costs (including cost, equipment, etc.). In some embodiments, the project estimate may be based on an existing carbon dioxide reinjection plant that lacks the NGL recovery process.

The method 400 may then proceed to block 408, where the recovery rate is incremented. The NGL recovery rate may be incremented by a relatively small percentage, for example no more than about 10 percent, not more than about 5 percent, or no more than about 1 percent. The method 400 may then proceed to block 410, which is substantially similar to block 404. The method 400 may then proceed to block 412, which is substantially similar to block 406.

The method 400 may then proceed to block 414, where the method 400 may determine whether the project estimate has improved. For instance, the method 400 may compare the project estimate from block 412 with the previous project estimate (either block 406 or the previous iteration of block 412) and determine whether the revised estimate is more economically desirable. The method 400 may return to block 408 when the condition at block 414 is met. Otherwise, the method 400 may proceed to block 416.

At block 416, the method 400 may choose the previous project estimate as the final estimate. For example, the method 400 may select the previous NGL recovery rate (either block 406 or the previous iteration of block 412) instead of the estimate obtained at block 412. In some embodiments, the desired or optimum recovery rate selected at block 416 may represent a range of desirable or optimum points, as opposed to a single point. Accordingly, the method 400 may select the equipment sizing corresponding to the selected NGL recovery rate. The selected project estimate and sizing may then be used for the NGL recovery process. Of course, it will be appreciated that the method 400 may be revised to include a decremented, top-down estimation approach as opposed to an incremented, bottom-up estimation approach.

The method 400 may have several advantages over other project estimation methods. For example, process equipment of a specific size may be selected, and the corresponding recovery rate determined. Alternatively, a required recovery rate may be selected, and the equipment sized to achieve the recovery rate. However, it has been discovered that such approaches are inflexible and often yields suboptimal process economics. For example, relatively high NGL recovery rates will not lead to an improvement in process economics, e.g. because of the exponential increase in energy consumption. In contrast, the method 400 provides a flexible approach to determining a desirable or optimal project estimate.

In an embodiment, the equipment size may be configured to allow for variations in recovery rates to accommodate changes in economic conditions, such as $C_{3+}$ or energy pricing. Specifically, the equipment described herein can be sized above or below the desired or optimum amount to allow the processes described herein to operate at recovery rates slightly greater than or slightly less than the desirable or optimum point obtained in method 400. As the process parameters and the energy requirements may be closely related, the ability of the process to continue to successfully operate under differing conditions may be reflected by constrained changes in the energy requirements of the process. When operating in the first amount 304 or the second amount 306 on the curve 302 in FIG. 3, significant increases or decreases in NGL recovery rate may be obtained with little change in the energy requirements. Such is not the case when operating in the third amount 308 on the curve 302 in FIG. 3, where significant increases or decreases in energy requirements yield only incremental changes in NGL recovery rate.

EXAMPLES

In one example, a process simulation was performed using the NGL recovery process 200 shown in FIG. 2. The simulation was performed using the Hyprotech Ltd. HYSYS Process v2.1.1 (Build 3198) software package. The NGL recovery process 200 separated the dehydrated carbon dioxide recycle stream 160 into the purified carbon dioxide recycle stream 164, the NGL rich stream 162, and the acid gas stream 270. The specified values are indicated by an asterisk (*). The physical properties are provided in degrees Fahrenheit (F), pounds per square inch gauge (psig), million standard cubic feet per day (MMSCFD), pounds per hour (lb/hr), U.S. gallons per minute (USGPM), and British thermal units per hour (Btu/hr). The material streams, their compositions, and the associated energy streams produced by the simulation are provided in tables 1, 2, and 3 below, respectively.

TABLE 1

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 0.9838 | 0.9392 | 1.0000 |
| Temperature (F.) | 104.0* | 45.00* | 4.011 |
| Pressure (psig) | 340.0* | 335.0 | 330.0 |
| Molar Flow (MMSCFD) | 17.00* | 17.00 | 15.88 |
| Mass Flow (lb/hr) | 8.049e+04 | 8.049e+04 | 7.254e+04 |
| Liquid Volume Flow (USGPM) | 218.1 | 218.1 | 192.3 |
| Heat Flow (Btu/hr) | −2.639e+08 | −2.658e+08 | −2.577e+08 |

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 97.39 | 202.6 | 120.0* |
| Pressure (psig) | 325.0 | 340.0 | 635.3* |
| Molar Flow (MMSCFD) | 15.88 | 1.119 | 1.119 |
| Mass Flow (lb/hr) | 7.254e+04 | 7947 | 7947 |
| Liquid Volume Flow (USGPM) | 192.3 | 25.84 | 25.84 |
| Heat Flow (Btu/hr) | −2.558e+08 | −8.443e+06 | −8.862e+06 |

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.9 | 100.0* | 111.8 |
| Pressure (psig) | 200.3* | 5.304* | 185.3* |
| Molar Flow (MMSCFD) | 1.119 | 0.1030 | 1.016 |
| Mass Flow (lb/hr) | 7947 | 446.4 | 7501 |
| Liquid Volume Flow (USGPM) | 25.84 | 1.100 | 24.74 |
| Heat Flow (Btu/hr) | −8.862e+06 | −1.083e+06 | −7.779e+06 |

TABLE 2

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0333* | 0.0333 | 0.0327 |
| Comp Mole Frac (Nitrogen) | 0.0054* | 0.0054 | 0.0058 |
| Comp Mole Frac ($CO_2$) | 0.7842* | 0.7842 | 0.8359 |
| Comp Mole Frac (Methane) | 0.0521* | 0.0521 | 0.0558 |
| Comp Mole Frac (Ethane) | 0.0343* | 0.0343 | 0.0348 |
| Comp Mole Frac (Propane) | 0.0406* | 0.0406 | 0.0313 |
| Comp Mole Frac (i-Butane) | 0.0072* | 0.0072 | 0.0022 |
| Comp Mole Frac (n-Butane) | 0.0171* | 0.0171 | 0.0015 |
| Comp Mole Frac (i-Pentane) | 0.0058* | 0.0058 | 0.0000 |
| Comp Mole Frac (n-Pentane) | 0.0057* | 0.0057 | 0.0000 |
| Comp Mole Frac (n-Hexane) | 0.0070* | 0.0070 | 0.0000 |
| Comp Mole Frac (n-Octane) | 0.0071* | 0.0071 | 0.0000 |
| Comp Mole Frac ($H_2O$) | 0.0000* | 0.0000 | 0.0000 |

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0327 | 0.0421 | 0.0421 |
| Comp Mole Frac (Nitrogen) | 0.0058 | 0.0000 | 0.0000 |
| Comp Mole Frac ($CO_2$) | 0.8359 | 0.0500 | 0.0500 |
| Comp Mole Frac (Methane) | 0.0558 | 0.0000 | 0.0000 |
| Comp Mole Frac (Ethane) | 0.0348 | 0.0281 | 0.0281 |
| Comp Mole Frac (Propane) | 0.0313 | 0.1728 | 0.1728 |
| Comp Mole Frac (i-Butane) | 0.0022 | 0.0789 | 0.0789 |
| Comp Mole Frac (n-Butane) | 0.0015 | 0.2388 | 0.2388 |
| Comp Mole Frac (i-Pentane) | 0.0000 | 0.0887 | 0.0887 |
| Comp Mole Frac (n-Pentane) | 0.0000 | 0.0866 | 0.0866 |
| Comp Mole Frac (n-Hexane) | 0.0000 | 0.1063 | 0.1063 |
| Comp Mole Frac (n-Octane) | 0.0000 | 0.1077 | 0.1077 |
| Comp Mole Frac ($H_2O$) | 0.0000 | 0.0000 | 0.0000 |

| Name | Low-Pressure Sour NGL Rich Stream 268 | Acid Gas Stream 270 | NGL Rich Stream 162 |
|---|---|---|---|
| Comp Mole Frac ($H_2S$) | 0.0421 | 0.4568 | 0.0000 |
| Comp Mole Frac (Nitrogen) | 0.0000 | 0.0000 | 0.0000 |
| Comp Mole Frac ($CO_2$) | 0.0500 | 0.5432 | 0.0000 |
| Comp Mole Frac (Methane) | 0.0000 | 0.0000 | 0.0000 |
| Comp Mole Frac (Ethane) | 0.0281 | 0.0000 | 0.0309 |
| Comp Mole Frac (Propane) | 0.1728 | 0.0000 | 0.1903 |
| Comp Mole Frac (i-Butane) | 0.0789 | 0.0000 | 0.0869 |
| Comp Mole Frac (n-Butane) | 0.2388 | 0.0000 | 0.2630 |
| Comp Mole Frac (i-Pentane) | 0.0887 | 0.0000 | 0.0977 |
| Comp Mole Frac (n-Pentane) | 0.0866 | 0.0000 | 0.0954 |
| Comp Mole Frac (n-Hexane) | 0.1063 | 0.0000 | 0.1171 |
| Comp Mole Frac (n-Octane) | 0.1077 | 0.0000 | 0.1186 |
| Comp Mole Frac ($H_2O$) | 0.0000 | 0.0000 | 0.0000 |

TABLE 3

Energy Streams

| Name | Heat Flow (Btu/hr) |
|---|---|
| Condenser Q Energy Stream 282 | 1.469e+06 |
| Reboiler Q Energy Stream 284 | 1.152e+06 |

In another example, the process simulation was repeated using a different dehydrated carbon dioxide recycle stream 160. The material streams, their compositions, and the associated energy streams produced by the simulation are provided in tables 4, 5, and 6 below, respectively.

TABLE 4

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 0.9874 | 0.9286 | 1.0000 |
| Temperature (F.) | 104.0* | 60.00* | 22.77 |
| Pressure (psig) | 685.3* | 680.3 | 590.0 |
| Molar Flow (MMSCFD) | 20.00* | 20.00 | 18.86 |

TABLE 4-continued

Material Streams

| | | | |
|---|---|---|---|
| Mass Flow (lb/hr) | 8.535e+04 | 8.535e+04 | 7.780e+04 |
| Liquid Volume Flow (USGPM) | 258.0 | 258.0 | 232.2 |
| Heat Flow (Btu/hr) | −2.741e+08 | −2.760e+08 | −2.683e+08 |

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 87.48 | 290.7 | 120.0* |
| Pressure (psig) | 585.0 | 600.0 | 635.3* |
| Molar Flow (MMSCFD) | 18.86 | 1.139 | 1.139 |
| Mass Flow (lb/hr) | 7.780e+04 | 7552 | 7552 |
| Liquid Volume Flow (USGPM) | 232.2 | 25.83 | 25.83 |
| Heat Flow (Btu/hr) | −2.663e+08 | −7.411e+06 | −8.371e+06 |

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.5 | 100.0* | 118.6 |
| Pressure (psig) | 200.3* | 5.304* | 185.3* |
| Molar Flow (MMSCFD) | 1.139 | 0.02943 | 1.110 |
| Mass Flow (lb/hr) | 7552 | 141.2 | 7411 |
| Liquid Volume Flow (USGPM) | 25.83 | 0.3421 | 25.49 |
| Heat Flow (Btu/hr) | −8.371e+06 | −5.301e+05 | −7.841e+06 |

TABLE 5

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0004* | 0.0004 | 0.0004 |
| Comp Mole Frac (Nitrogen) | 0.0153* | 0.0153 | 0.0162 |
| Comp Mole Frac ($CO_2$) | 0.6592* | 0.6592 | 0.6975 |
| Comp Mole Frac (Methane) | 0.1813* | 0.1813 | 0.1922 |
| Comp Mole Frac (Ethane) | 0.0620* | 0.0620 | 0.0620 |
| Comp Mole Frac (Propane) | 0.0411* | 0.0411 | 0.0275 |
| Comp Mole Frac (i-Butane) | 0.0064* | 0.0064 | 0.0017 |
| Comp Mole Frac (n-Butane) | 0.0179* | 0.0179 | 0.0024 |
| Comp Mole Frac (i-Pentane) | 0.0040* | 0.0040 | 0.0000 |
| Comp Mole Frac (n-Pentane) | 0.0049* | 0.0049 | 0.0000 |
| Comp Mole Frac (n-Hexane) | 0.0030* | 0.0030 | 0.0000 |
| Comp Mole Frac (n-Octane) | 0.0045* | 0.0045 | 0.0000 |
| Comp Mole Frac ($H_2O$) | 0.0000* | 0.0000 | 0.0000 |

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0004 | 0.0008 | 0.0008 |
| Comp Mole Frac (Nitrogen) | 0.0162 | 0.0000 | 0.0000 |
| Comp Mole Frac ($CO_2$) | 0.6975 | 0.0250 | 0.0250 |
| Comp Mole Frac (Methane) | 0.1922 | 0.0000 | 0.0000 |
| Comp Mole Frac (Ethane) | 0.0620 | 0.0613 | 0.0613 |
| Comp Mole Frac (Propane) | 0.0275 | 0.2670 | 0.2670 |
| Comp Mole Frac (i-Butane) | 0.0017 | 0.0836 | 0.0836 |
| Comp Mole Frac (n-Butane) | 0.0024 | 0.2751 | 0.2751 |
| Comp Mole Frac (i-Pentane) | 0.0000 | 0.0697 | 0.0697 |
| Comp Mole Frac (n-Pentane) | 0.0000 | 0.0858 | 0.0858 |
| Comp Mole Frac (n-Hexane) | 0.0000 | 0.0527 | 0.0527 |
| Comp Mole Frac (n-Octane) | 0.0000 | 0.0790 | 0.0790 |
| Comp Mole Frac ($H_2O$) | 0.0000 | 0.0000 | 0.0000 |

TABLE 5-continued

Stream Compositions

| Name | Low-Pressure Sour NGL Rich Stream 268 | Acid Gas Stream 270 | NGL Rich Stream 162 |
|---|---|---|---|
| Comp Mole Frac ($H_2S$) | 0.0008 | 0.0315 | 0.0000 |
| Comp Mole Frac (Nitrogen) | 0.0000 | 0.0000 | 0.0000 |
| Comp Mole Frac ($CO_2$) | 0.0250 | 0.9685 | 0.0000 |
| Comp Mole Frac (Methane) | 0.0000 | 0.0000 | 0.0000 |
| Comp Mole Frac (Ethane) | 0.0613 | 0.0000 | 0.0629 |
| Comp Mole Frac (Propane) | 0.2670 | 0.0000 | 0.2740 |
| Comp Mole Frac (i-Butane) | 0.0836 | 0.0000 | 0.0858 |
| Comp Mole Frac (n-Butane) | 0.2751 | 0.0000 | 0.2824 |
| Comp Mole Frac (i-Pentane) | 0.0697 | 0.0000 | 0.0716 |
| Comp Mole Frac (n-Pentane) | 0.0858 | 0.0000 | 0.0881 |
| Comp Mole Frac (n-Hexane) | 0.0527 | 0.0000 | 0.0541 |
| Comp Mole Frac (n-Octane) | 0.0790 | 0.0000 | 0.0811 |
| Comp Mole Frac ($H_2O$) | 0.0000 | 0.0000 | 0.0000 |

TABLE 6

Energy Streams

| Name | Heat Flow (Btu/hr) |
|---|---|
| Condenser Q Energy Stream 282 | 1.884e+06 |
| Reboiler Q Energy Stream 284 | 2.211e+06 |

In a third example, the process simulation was repeated using a different dehydrated carbon dioxide recycle stream 160. The material streams, their compositions, and the associated energy streams produced by the simulation are provided in tables 7, 8, and 9 below, respectively.

TABLE 7

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 1.0000 | 0.9988 | 1.0000 |
| Temperature (F.) | 104.0* | 30.00* | 4.617 |
| Pressure (psig) | 340.0* | 335.0 | 330.0 |
| Molar Flow (MMSCFD) | 17.00* | 17.00 | 16.82 |
| Mass Flow (lb/hr) | 8.083e+04 | 8.083e+04 | 7.968e+04 |
| Liquid Volume Flow (USGPM) | 203.4 | 203.4 | 199.5 |
| Heat Flow (Btu/hr) | −3.016e+08 | −3.032e+08 | −3.025e+08 |

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 76.45 | 199.4 | 120.0* |
| Pressure (psig) | 325.0 | 340.0 | 635.3* |
| Molar Flow (MMSCFD) | 16.82 | 0.1763 | 0.1763 |
| Mass Flow (lb/hr) | 7.968e+04 | 1153 | 1153 |
| Liquid Volume Flow (USGPM) | 199.5 | 3.894 | 3.894 |
| Heat Flow (Btu/hr) | −3.009e+08 | −1.278e+06 | −1.340e+06 |

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.4 | 100.0* | 115.4 |

TABLE 7-continued

Material Streams

| | | | |
|---|---|---|---|
| Pressure (psig) | 200.3* | 5.304* | 185.3* |
| Molar Flow (MMSCFD) | 0.1763 | 0.01048 | 0.1659 |
| Mass Flow (lb/hr) | 1153 | 48.82 | 1105 |
| Liquid Volume Flow (USGPM) | 3.894 | 0.1188 | 3.776 |
| Heat Flow (Btu/hr) | −1.340e+06 | −1.653e+05 | −1.175e+06 |

TABLE 8

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0031* | 0.0031 | 0.0030 |
| Comp Mole Frac (Nitrogen) | 0.0008* | 0.0008 | 0.0008 |
| Comp Mole Frac ($CO_2$) | 0.9400* | 0.9400 | 0.9493 |
| Comp Mole Frac (Methane) | 0.0219* | 0.0219 | 0.0222 |
| Comp Mole Frac (Ethane) | 0.0156* | 0.0156 | 0.0157 |
| Comp Mole Frac (Propane) | 0.0116* | 0.0116 | 0.0088 |
| Comp Mole Frac (i-Butane) | 0.0015* | 0.0015 | 0.0002 |
| Comp Mole Frac (n-Butane) | 0.0031* | 0.0031 | 0.0001 |
| Comp Mole Frac (i-Pentane) | 0.0007* | 0.0007 | 0.0000 |
| Comp Mole Frac (n-Pentane) | 0.0006* | 0.0006 | 0.0000 |
| Comp Mole Frac (n-Hexane) | 0.0005* | 0.0005 | 0.0000 |
| Comp Mole Frac (n-Octane) | 0.0006* | 0.0006 | 0.0000 |
| Comp Mole Frac ($H_2O$) | 0.0000* | 0.0000 | 0.0000 |

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0030 | 0.0094 | 0.0094 |
| Comp Mole Frac (Nitrogen) | 0.0008 | 0.0000 | 0.0000 |
| Comp Mole Frac ($CO_2$) | 0.9493 | 0.0500 | 0.0500 |
| Comp Mole Frac (Methane) | 0.0222 | 0.0000 | 0.0000 |
| Comp Mole Frac (Ethane) | 0.0157 | 0.0000 | 0.0000 |
| Comp Mole Frac (Propane) | 0.0088 | 0.2794 | 0.2794 |
| Comp Mole Frac (i-Butane) | 0.0002 | 0.1265 | 0.1265 |
| Comp Mole Frac (n-Butane) | 0.0001 | 0.2985 | 0.2985 |
| Comp Mole Frac (i-Pentane) | 0.0000 | 0.0713 | 0.0713 |
| Comp Mole Frac (n-Pentane) | 0.0000 | 0.0617 | 0.0617 |
| Comp Mole Frac (n-Hexane) | 0.0000 | 0.0482 | 0.0482 |
| Comp Mole Frac (n-Octane) | 0.0000 | 0.0550 | 0.0550 |
| Comp Mole Frac ($H_2O$) | 0.0000 | 0.0000 | 0.0000 |

| Name | Low-Pressure Sour NGL Rich Stream 268 | Acid Gas Stream 270 | NGL Rich Stream 162 |
|---|---|---|---|
| Comp Mole Frac ($H_2S$) | 0.0094 | 0.1584 | 0.0000 |
| Comp Mole Frac (Nitrogen) | 0.0000 | 0.0000 | 0.0000 |
| Comp Mole Frac ($CO_2$) | 0.0500 | 0.8416 | 0.0000 |
| Comp Mole Frac (Methane) | 0.0000 | 0.0000 | 0.0000 |
| Comp Mole Frac (Ethane) | 0.0000 | 0.0000 | 0.0000 |
| Comp Mole Frac (Propane) | 0.2794 | 0.0000 | 0.2970 |
| Comp Mole Frac (i-Butane) | 0.1265 | 0.0000 | 0.1345 |
| Comp Mole Frac (n-Butane) | 0.2985 | 0.0000 | 0.3174 |
| Comp Mole Frac (i-Pentane) | 0.0713 | 0.0000 | 0.0758 |
| Comp Mole Frac (n-Pentane) | 0.0617 | 0.0000 | 0.0656 |
| Comp Mole Frac (n-Hexane) | 0.0482 | 0.0000 | 0.0512 |
| Comp Mole Frac (n-Octane) | 0.0550 | 0.0000 | 0.0584 |
| Comp Mole Frac ($H_2O$) | 0.0000 | 0.0000 | 0.0000 |

TABLE 9

Energy Streams

| Name | Heat Flow (Btu/hr) |
|---|---|
| Condenser Q Energy Stream 282 | 6.236e+06 |
| Reboiler Q Energy Stream 284 | 5.666e+06 |

It should be highlighted that in at least certain embodiments that streams in an NGL recovery system (e.g., a hydrocarbon feed stream, a carbon dioxide recycle stream, and/or an NGL rich stream) are not subjected to cryogenic conditions, membranes, and/or carbon dioxide recovery solvents between being received and being separated into output streams (e.g., a heavy hydrocarbon rich stream, a purified carbon dioxide recycle stream, an NGL rich stream, and/or an acid gas stream). For instance, other recovery systems may use a carbon dioxide recovery solvent to separate carbon dioxide from a stream (e.g., use a carbon dioxide recovery solvent to absorb/dissolve carbon dioxide from a stream comprising both hydrocarbons and carbon dioxide).

Furthermore, it should also be highlighted that some embodiments may use a dehydration solvent to remove water (e.g., liquid water or water vapor) despite optionally not using a carbon dioxide recovery solvent. For example, in certain circumstances, an incoming feed stream may be "wet" in that it contains some amount of water vapor. In such cases, a dehydration solvent such as, but not limited to, triethylene glycol (TEG), diethylene glycol (DEG), ethylene glycol (MEG), tetraethylene glycol (TREG), other glycols, or any other dehydration solvent may be used to remove the water from the stream. However, embodiments are not limited to any particular method of dehydrating a stream and other methods of dehydrating a stream can be used as well.

As used herein, the term consisting essentially of excludes additional equilibrium-staged separation or reaction processes, but does not exclude additional piping, accumulators, heat exchangers, pipe tees and similar "simple" separations, valves, sensors, material transfer devices, or anything else that does not materially change the inherent properties of a significant portion of the streams in question.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Specifically, while the process is described in terms of a continuous process, it is contemplated that the process can be implemented as a batch process. In addition, where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Moreover, the percentages described herein may be mole fraction, weight fraction, or volumetric fraction.

Accordingly, the scope of protection is not limited by the description set out above but is only limited by the claims that follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
   receiving a carbon dioxide recycle stream, wherein the carbon dioxide recycle stream comprises carbon dioxide, methane, and natural gas liquids, wherein the natural gas liquids comprise $C_3$-$C_8$ hydrocarbons;
   cooling the carbon dioxide recycle stream in a first heat exchanger to produce a cooled carbon dioxide recycle stream;
   separating the cooled carbon dioxide recycle stream into a purified carbon dioxide recycle stream and a natural gas liquids stream in a separation column, wherein the purified carbon dioxide recycle stream is suitable for reinjection into a subterranean formation in an enhanced oil recovery process, wherein the purified carbon dioxide recycle stream comprises substantially all of the carbon dioxide and substantially all of the methane from the carbon dioxide recycle stream, wherein the natural gas liquids stream comprises substantially none of the carbon dioxide and less than about 70 mole % of the natural gas liquids from the carbon dioxide recycle stream;
   heating the purified carbon dioxide recycle stream in the first heat exchanger to produce a heated purified carbon dioxide recycle stream;
   transferring the heated purified carbon dioxide recycle stream to a facility that is configured to reinject the heated purified carbon dioxide recycle stream into the subterranean formation in the enhanced oil recovery process;
   cooling the natural gas liquids stream in a second heat exchanger to produce a cooled natural gas liquids stream;
   expanding the cooled natural gas liquids stream in an expansion valve to produce an expanded natural gas liquids stream; and
   transferring the expanded natural gas liquids stream from the expansion valve directly to a sweetener that is configured to remove all $H_2S$ from the expanded natural gas liquids stream.

2. The method according to claim 1, wherein the carbon dioxide recycle stream comprises $H_2S$, and wherein separating the cooled carbon dioxide recycle stream into the purified carbon dioxide recycle stream and the natural gas liquids stream comprises separating the $H_2S$ into the natural gas liquids stream.

3. The method according to claim 2, wherein separating the $H_2S$ into the natural gas liquids stream comprises separating the $H_2S$ into the natural gas liquids stream such that the natural gas liquids stream comprises at least 4 mole % $H_2S$, and wherein the method further comprises separating the natural gas liquids stream into a sweet natural gas liquids stream and an $H_2S$ stream.

4. The method according to claim 1, further comprising dehydrating the carbon dioxide recycle stream before separating the cooled carbon dioxide recycle stream into the purified carbon dioxide recycle stream and the natural gas liquids stream.

5. The method according to claim 1, further comprising adding additional carbon dioxide to the purified carbon dioxide recycle stream to form a carbon dioxide injection stream.

6. The method according to claim 1, wherein separating the carbon dioxide recycle stream into the purified carbon dioxide recycle stream and the natural gas liquids stream consists essentially of:
   receiving the cooled carbon dioxide recycle stream at the separation column;
   reboiling a portion of the cooled carbon dioxide recycle stream received from the separation column with a reboiler to generate the natural gas liquids stream; and
   condensing another portion of the cooled carbon dioxide recycle stream received from the separation column with a condenser to generate the purified carbon dioxide recycle stream.

7. A system comprising:
   piping configured to receive a recycle stream, wherein the recycle stream comprises an injection gas, methane, and natural gas liquids, wherein the natural gas liquids comprise $C_3$-$C_8$ hydrocarbons;
   a first heat exchanger configured to cool the recycle stream to produce a cooled recycle stream, wherein the first heat exchanger uses a purified recycle stream to cool the recycle stream;
   a separator coupled to the piping and configured to separate the cooled recycle stream into the purified recycle stream and a natural gas liquids stream, wherein the purified recycle stream is suitable for reinjection into a subterranean formation in an enhanced oil recovery process, wherein the purified recycle stream comprises substantially all of the injection gas and substantially all of the methane from the recycle stream, wherein the natural gas liquids stream comprises substantially none of the injection gas and less than about 70 mole of the natural gas liquids from the recycle stream;
   a facility coupled to the separator and configured to promote reinjection of the purified recycle stream into the subterranean formation in the enhanced oil recovery process;
   a second heat exchanger configured to cool the natural gas liquids stream to produce a cooled natural gas liquids stream;
   an expansion valve configured to expand the cooled natural gas liquids to produce an expanded natural gas liquids stream; and
   a sweetener configured to remove all $H_2S$ from the expanded natural as liquids stream, wherein the expanded natural gas lipids stream is transferred directly from the expansion valve to the sweetener.

8. The system according to claim 7, wherein the injection gas comprises carbon dioxide.

9. The system according to claim 7, wherein the separator is configured to separate the cooled recycle stream into the purified recycle stream and the natural gas liquids stream using a phase separator or a column, wherein the system further comprises a crude oil source, and wherein the natural gas liquids stream is combined with crude oil from the crude oil source.

10. The system according to claim 7, wherein the natural gas liquids stream comprises at least 4 mole % $H_2S$, and wherein the system is further configured to separate the natural gas liquids stream into a sweet natural gas liquids stream and an $H_2S$ stream.

11. The system according to claim 7, wherein the system is further configured to:
receive a feed stream;
separate the feed stream into the recycle stream and a heavy hydrocarbons stream, wherein the heavy hydrocarbons stream comprises $C_{9+}$ hydrocarbons; and
dehydrate the recycle stream using a dehydration solvent before separating the cooled recycle stream into the purified recycle stream and the natural gas liquids stream.

12. The system according to claim 7, wherein the separator consists essentially of a separation column, a reboiler, and a condenser, wherein the separation column receives the cooled recycle stream, wherein the reboiler receives a first portion of the cooled recycle stream from the separation column and generates the natural gas liquids stream, and wherein the condenser receives a second portion of the cooled recycle stream from the separation column and generates the purified recycle stream.

13. A set of process equipment comprising:
an input line configured to receive a recycle stream, wherein the recycle stream comprises an injection gas, methane, and natural gas liquids, wherein the natural gas liquids comprise $C_3$-$C_8$ hydrocarbons;
a first heat exchanger configured to cool the recycle stream to produce a cooled recycle stream, wherein the first heat exchanger uses a purified recycle stream to cool the recycle stream;
a separator configured to receive the cooled recycle stream from the input line and separate the recycle stream into the purified recycle stream and a natural gas liquids stream, wherein the purified recycle stream is suitable for reinjection into a subterranean formation in an enhanced oil recovery process;
a first output line configured to output the purified recycle stream from the separator, wherein the purified recycle stream comprises substantially all of the injection gas and substantially all of the methane from the recycle stream;
a second output line configured to output the natural gas liquids stream from the separator, wherein the natural gas liquids stream comprises substantially none of the injection gas and less than about 70 mole % of the natural gas liquids from the recycle stream;
a facility coupled to the separator and configured to transport the purified recycle stream to a site where the purified recycle stream is reinjected into the subterranean formation in the enhanced oil recovery process;
a second heat exchanger configured to cool the natural gas liquids stream to produce a cooled natural gas liquids stream;
an expansion valve configured to expand the cooled natural ids to produce an expanded natural gas liquids stream; and
a sweetener configured to remove all $H_2S$ from the expanded natural gas liquids stream, wherein the expanded natural gas liquids stream is transferred directly from the expansion valve to the sweetener.

14. The set of process equipment according to claim 13, wherein the separator comprises a phase separator, wherein the phase separator comprises a knock-out drum, a flash drum, a reboiler, a condenser, or a heat exchanger.

15. The set of process equipment according to claim 13, wherein the separator comprises a column, wherein the column comprises a scrubber, a stripper, an absorber, an adsorber, a packed column, or a distillation column.

16. The set of process equipment according to claim 13, wherein the natural gas liquids stream comprises at least 4 mole % $H_2S$, and wherein the set of process equipment further comprises a second separator configured to receive the natural gas liquids stream from the second output line and separate the natural gas liquids stream into a sweet natural gas liquids stream and an $H_2S$ stream.

17. The set of process equipment according to claim 16, further comprising a third separator configured to receive a feed stream and separate the feed stream into the recycle stream and a heavy hydrocarbons stream, and wherein the heavy hydrocarbons stream comprises $C_{9+}$ hydrocarbons, branched hydrocarbons, or aromatic hydrocarbons.

18. The set of process equipment according to claim 13, wherein the separator consists essentially of a separation column, a reboiler, and a condenser, wherein the separation column receives the cooled recycle stream, wherein the reboiler receives a first portion of the cooled recycle stream from the separation column and generates the natural gas liquids stream, and wherein the condenser receives a second portion of the cooled recycle stream from the separation column and generates the purified recycle stream.

19. The set of process equipment according to claim 13, wherein the separator comprises a phase separator, wherein the phase separator comprises a knock-out drum, a flash drum, a reboiler, a condenser, or a heat exchanger.

20. The method according to claim 1, wherein the carbon dioxide recycle stream comprises ethane, wherein the purified carbon dioxide recycle stream comprises substantially all of the ethane from the carbon dioxide recycle stream, and wherein the molar percentage of the carbon dioxide in the purified carbon dioxide recycle stream is greater than a molar percentage of the ethane in the purified carbon dioxide recycle stream.

21. The method according to claim 1, further comprising:
receiving a feed stream, wherein the feed stream comprises the carbon dioxide, the methane, ethane, the $C_3$ hydrocarbons, $C_4$-$C_8$ hydrocarbons, $C_{9+}$ hydrocarbons, branched hydrocarbons, and aromatic hydrocarbons; and
separating the feed stream into the carbon dioxide recycle stream and a heavy hydrocarbons stream, wherein the carbon dioxide recycle stream comprises the carbon dioxide, the methane, the ethane, the $C_3$ hydrocarbons, and the $C_4$-$C_8$ hydrocarbons, and wherein the heavy hydrocarbons stream comprises the $C_{9+}$ hydrocarbons, the branched hydrocarbons, and the aromatic hydrocarbons.

22. The system according to claim 7, wherein the recycle stream comprises ethane, wherein the purified recycle stream comprises substantially all of the ethane from the recycle stream, and wherein the molar percentage of the carbon dioxide in the purified recycle stream is greater than a molar percentage of the ethane in the purified recycle stream.

23. The system according to claim 7, further comprising:
a feed line configured to receive a feed stream, wherein the feed stream comprises the injection gas, the methane, ethane, the $C_3$ hydrocarbons, $C_4$-$C_8$ hydrocarbons, $C_{9+}$ hydrocarbons, branched hydrocarbons, and aromatic hydrocarbons; and a heavy hydrocarbon separator configured to separate the feed stream into the recycle stream and a heavy hydrocarbons stream, wherein the recycle stream comprises the injection gas, the methane, the ethane, the $C_3$ hydrocarbons, and the $C_4$-$C_8$ hydrocarbons, and wherein the heavy hydrocarbons stream comprises the $C_{9+}$ hydrocarbons, the branched hydrocarbons, and the aromatic hydrocarbons.

24. The set of process equipment according to claim 13, wherein the recycle stream comprises ethane, wherein the purified recycle stream is substantially all of the ethane from the recycle stream, and wherein the molar percentage of the carbon dioxide in the purified recycle stream is greater than a molar percentage of the ethane in the purified recycle stream.

25. The set of process equipment according to claim 13, further comprising:
a feed line configured to receive a feed stream, wherein the feed stream comprises the injection gas, the methane, ethane, the $C_3$ hydrocarbons, $C_4$-$C_8$ hydrocarbons, $C_{9+}$ hydrocarbons, branched hydrocarbons, and aromatic hydrocarbons; and
a heavy hydrocarbon separator configured to separate the feed stream into the recycle stream and a heavy hydrocarbons stream, wherein the recycle stream comprises the injection gas, the methane, the ethane, the $C_3$ hydrocarbons, and the $C_4$-$C_8$ hydrocarbons, and wherein the heavy hydrocarbons stream comprises the $C_{9+}$ hydrocarbons, the branched hydrocarbons, and the aromatic hydrocarbons.

26. The method according to claim 1, wherein the natural gas liquids stream comprises from about 10 mole % to about 50 mole % of the natural gas liquids from the carbon dioxide recycle stream.

27. The method according to claim 1, wherein the natural gas liquids stream comprises from about 20 mole % to about 35 mole % of the natural gas liquids from the carbon dioxide recycle stream.

28. The system according to claim 7, wherein the natural gas liquids stream comprises from about 10 mole % to about 50 mole % of the natural gas liquids from the recycle stream.

29. The system according to claim 7, wherein the natural gas liquids stream comprises from about 20 mole % to about 35 mole % of the natural gas liquids from the recycle stream.

30. The set of process equipment according to claim 13, wherein the natural gas liquids stream comprises from about 10 mole % to about 50 mole % of the natural gas liquids from the recycle stream.

31. The set of process equipment according to claim 13, wherein the natural gas liquids stream comprises from about 20 mole % to about 35 mole % of the natural gas liquids from the recycle stream.

32. The method according to claim 1, wherein the separation column does not have a carbon dioxide recovery solvent, and wherein the separation column is not operated at cryogenic conditions.

33. The system according to claim 7, wherein the separator does not have a carbon dioxide recovery solvent, and wherein the separator is not operated at cryogenic conditions.

34. The set of process equipment according to claim 13, wherein the separator does not have a carbon dioxide recovery solvent, and wherein the separator is not operated at cryogenic conditions.

35. The method according to claim 1, wherein the second heat changer comprises an air cooler, and wherein the sweetener is the only sweetener used in the method.

36. The system according to claim 7, wherein the second heat exchanger comprises an air cooler, and wherein the sweetener is the only sweetener in the system.

37. The set of process equipment according to claim 13, wherein the second heat exchanger comprises an air cooler, and wherein the sweetener is the only sweetener in the set of process equipment.

* * * * *

UNITED STATES PATENT AND TRADEMARK OFFICE
CERTIFICATE OF CORRECTION

PATENT NO. : 9,574,823 B2
APPLICATION NO. : 13/946753
DATED : February 21, 2017
INVENTOR(S) : Eric Prim It is certified that error appears in the above-identified patent and that said Letters Patent is hereby corrected as shown below:

In the Claims

Column 18; Line 46, Claim 7 should read:

7. A system comprising:
 piping configured to receive a recycle stream, wherein the recycle stream comprises an injection gas, methane, and natural gas liquids, wherein the natural gas liquids comprise C3-C8 hydrocarbons;
 a first heat exchanger configured to cool the recycle stream to produce a cooled recycle stream, wherein the first heat exchanger uses a purified recycle stream to cool the recycle stream;
 a separator coupled to the piping and configured to separate the cooled recycle stream into the purified recycle stream and a natural gas liquids stream, wherein the purified recycle stream is suitable for reinjection into a subterranean formation in an enhanced oil recovery process, wherein the purified recycle stream comprises substantially all of the injection gas and substantially all of the methane from the recycle stream, wherein the natural gas liquids stream comprises substantially none of the injection gas and less than about 70 mole % of the natural gas liquids from the recycle stream;
 a facility coupled to the separator and configured to promote reinjection of the purified recycle stream into the subterranean formation in the enhanced oil recovery process;
 a second heat exchanger configured to cool the natural gas liquids stream to produce a cooled natural gas liquids stream;
 an expansion valve configured to expand the cooled natural gas liquids to produce an expanded natural gas liquids stream; and
 a sweetener configured to remove all H2S from the expanded natural gas liquids stream, wherein the expanded natural gas liquids stream is transferred directly from the expansion valve to the sweetener.

Signed and Sealed this
Second Day of May, 2017

Michelle K. Lee
*Director of the United States Patent and Trademark Office*

Column 19; Line 62, Claim 13 should read:

13. A set of process equipment comprising:
  an input line configured to receive a recycle stream, wherein the recycle stream comprises an injection gas, methane, and natural gas liquids, wherein the natural gas liquids comprise C3-C8 hydrocarbons;
  a first heat exchanger configured to cool the recycle stream to produce a cooled recycle stream, wherein the first heat exchanger uses a purified recycle stream to cool the recycle stream;
  a separator configured to receive the cooled recycle stream from the input line and separate the recycle stream into the purified recycle stream and a natural gas liquids stream, wherein the purified recycle stream is suitable for reinjection into a subterranean formation in an enhanced oil recovery process;
  a first output line configured to output the purified recycle stream from the separator, wherein the purified recycle stream comprises substantially all of the injection gas and substantially all of the methane from the recycle stream;
  a second output line configured to output the natural gas liquids stream from the separator, wherein the natural gas liquids stream comprises substantially none of the injection gas and less than about 70 mole % of the natural gas liquids from the recycle stream;
  a facility coupled to the separator and configured to transport the purified recycle stream to a site where the purified recycle stream is reinjected into the subterranean formation in the enhanced oil recovery process;
  a second heat exchanger configured to cool the natural gas liquids stream to produce a cooled natural gas liquids stream;
  an expansion valve configured to expand the cooled natural gas liquids to produce an expanded natural gas liquids stream; and
  a sweetener configured to remove all H2S from the expanded natural gas liquids stream, wherein the expanded natural gas liquids stream is transferred directly from the expansion valve to the sweetener.